Jan. 2, 1962     O. MUSGRAVE     3,015,237
VARIABLE SPEED DRIVE

Filed March 5, 1959     2 Sheets-Sheet 1

*INVENTOR.*
ORLY MUSGRAVE
BY Toulmin & Toulmin
ATTORNEYS

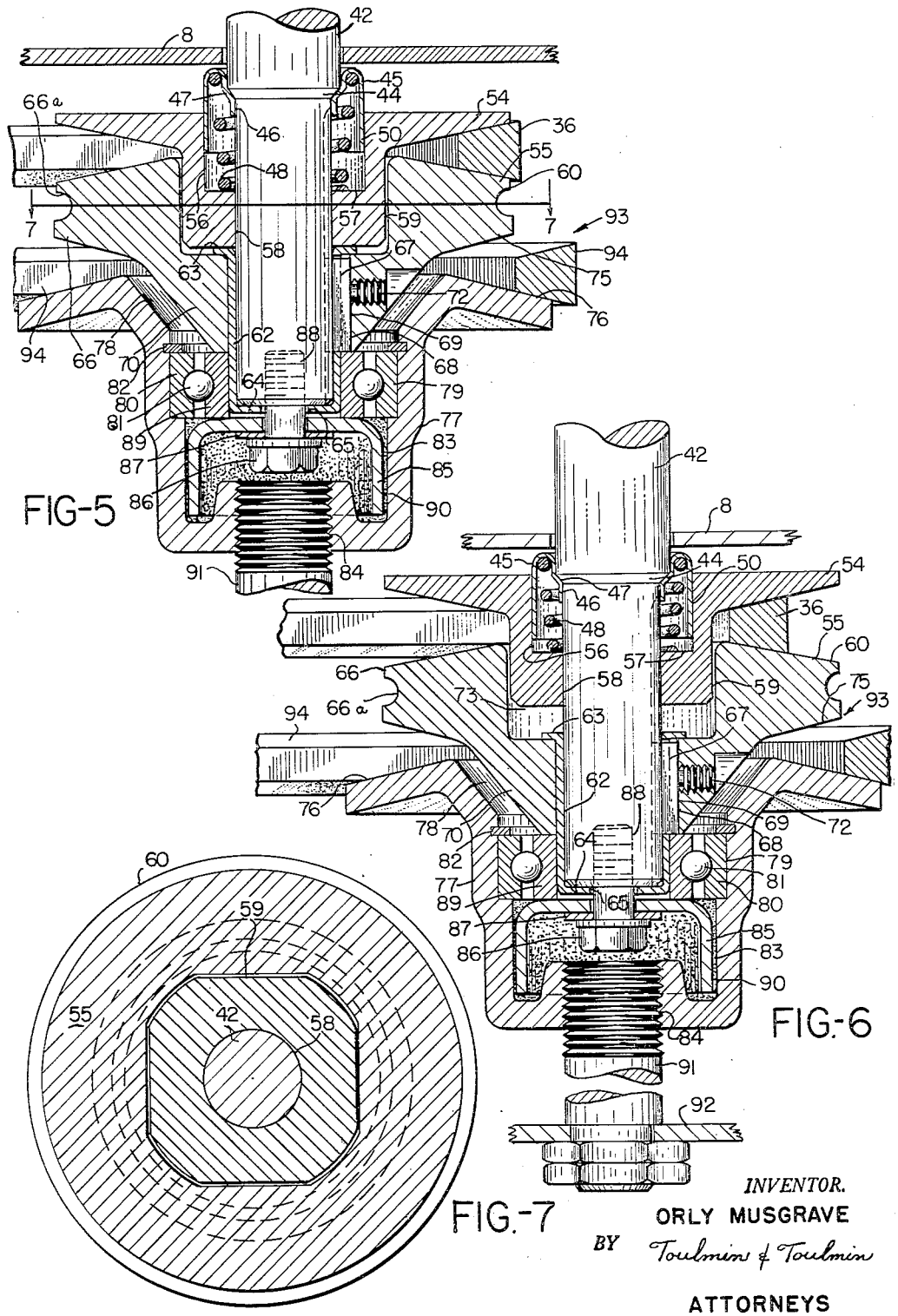

United States Patent Office 3,015,237
Patented Jan. 2, 1962

3,015,237
VARIABLE SPEED DRIVE
Orly Musgrave, 1731 Audubon Park Drive,
Springfield, Ohio
Filed Mar. 5, 1959, Ser. No. 797,401
3 Claims. (Cl. 74—230.17)

This invention relates to variable speed driving mechanism and more specifically to a variable speed assembly in combination with control means.

The transmission mechanism of the present invention may be employed in powered devices such as vehicles, lawn mowers, pumps, mixers, and the like, wherein the torque demand may vary suddenly. For example, in vehicles such as gasoline engine powered riding lawn mowers, the device may tend to stall as it moves up a sharp embankment. The practical effect of this is that the operator normally tends to depress the accelerator pedal further, resulting in higher speed but lowered torque to the device.

It is apparent that a drive mechanism which would result in higher torque output while maintaining adequate driving speed is required in such instances.

It is a primary object of the present invention, therefore, to provide a variable speed assembly having substantially increased torque output to the powered device in an accelerated condition of the power source.

It is an important object of the present invention to provide a novel structural arrangement of a variable speed assembly for a V-belt power transmission system constructed to prevent against derangement of the component parts, to be economically manufactured and which has proved thoroughly efficient in the attainment of the ends for which it is designed.

It is a further object of the invention to provide a variable speed assembly for a V-belt power transmission system wherein the shaft of the power source serves as the spindle shaft for the components of the variable speed assembly.

It is yet another object of the invention to provide a variable speed driving mechanism employing V-belt type power transmission wherein the driving pulley is a variable speed pulley and the driven pulley is of fixed diameter.

These and other objects of the invention will become apparent from the following detailed description and accompanying drawings wherein:

FIGURE 5 is an elevational view, partly in section, of the variable speed clutch assembly with the V-belt in position for high driving speed;

FIGURE 6 is a view similar to that of FIGURE 5 but with the V-belt of the variable speed clutch assembly in position for providing higher driving torque; and FIGURE 7 is a view taken on line 7—7 of FIGURE 5.

Figures 1, 2:
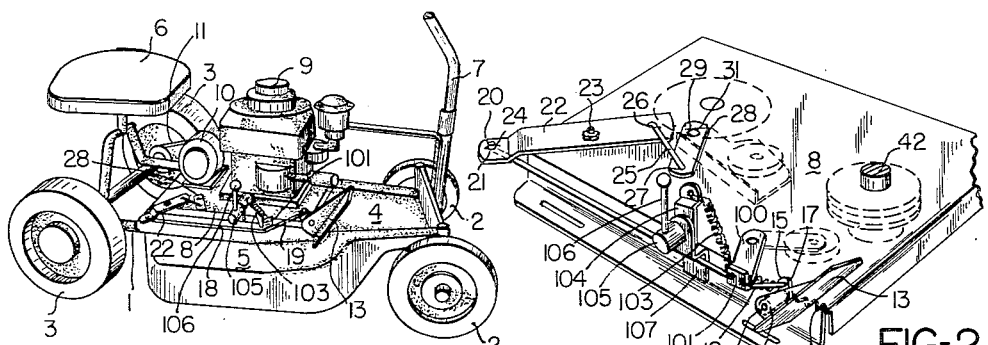
FIGURE 1 is a perspective view showing a vehicle in the form of a riding lawn mower in which the variable speed driving mechanism of the present invention may be utilized.
FIGURE 2 is a fragmentary plan view of the structure of FIGURE 1 on an enlarged scale showing details of the structural arrangement including the motor plate of the powered device.

Referring now more particularly to FIGURES 1 and 2 of the drawings the numeral 1 designates a frame having forward and rearward supporting wheels 2, 3, and a base plate 4 including foot supporting wing means 5. Supported from the frame rearwardly is a seat 6 while a steering post 7 extends upwardly on the frame rearwardly toward the seat.

Extending across the base plate 4 is a motor plate 8 which supports a power source in the form of a gas engine 9 and a gear box 10. A drive chain 11 extends from the gear box rearwardly and is connected in any suitable manner (not shown) for driving of the rearward wheels 3.

As shown more clearly in FIGURE 2 a manual controller in the form of a foot pedal 13 is mounted on a rock shaft 14 which fixedly carries a clutch plate 15 on its inner end. Rock shaft 14 is rotatably carried in tubular housing 16 which is welded to the motor plate 8 at a forward corner thereof. The clutch plate 15 is provided with a plurality of apertures 17 for receiving a clutch rod 18 in varying degrees of adjustment. Rod 18 is bent at 19 to provide for its reception in an aperture 17.

Rod 18 rearwardly is bent at 20 to be received through an opening 21 of a lever 22 pivoted at 23. A cotter pin 24 retains the rod portion 20 in loose engagement with the lever.

A link 25 passes through an opening 26 in the opposite end of the lever and is retained loosely by the lever in any suitable manner, as by a bend in the link; the opposite end of link 25 is similarly bent and loosely received in opening 27 of a rigid strap 28. Strap 28 is mounted on a pin 29 which extends through the motor plate 8. A bearing collar 30 in bearing engagement with the motor plate receives the upper end of pin 29 and also receives the strap 28. The pin 29 passes through an opening 31 of the strap 28 and is peened over to provide the strap, pin and bearing collar together for rotation as a unit.

Figure 3:
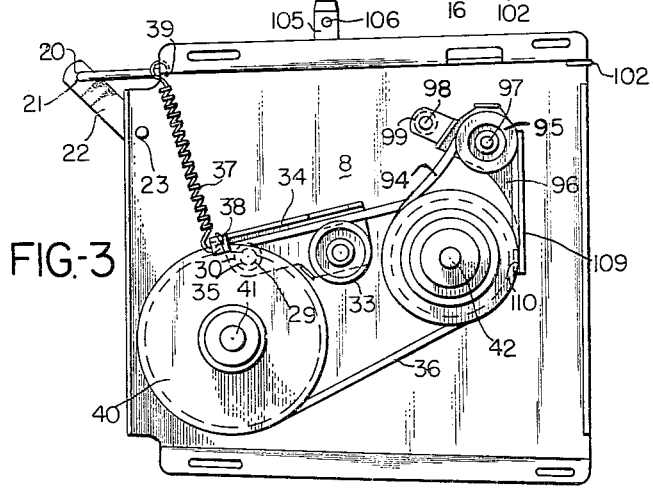
FIGURE 3 is a bottom plan view of the motor plate illustrating one position of the variable speed driving mechanism.
Figure 4:
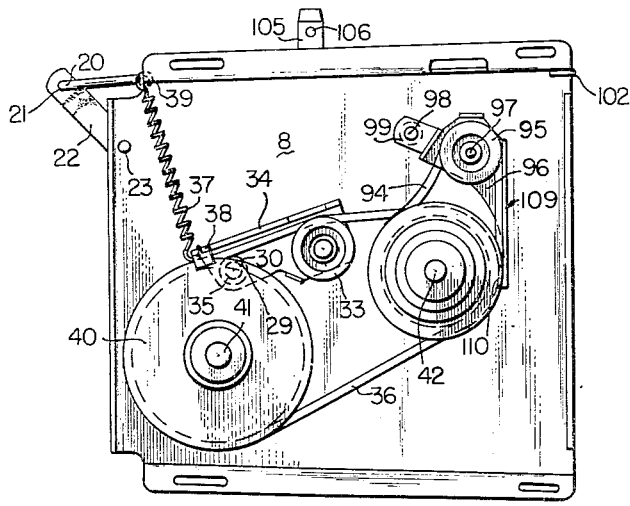
FIGURE 4 is a view similar to that of FIGURE 3 but illustrating another position of the variable speed driving mechanism.

As most clearly shown in FIGURES 3 and 4 a swinging idler pulley 33 is itself fixedly supported on swing arm 34; swing arm 34 has adjacent one end an opening 35 through which the lower end of pin 29 passes. The swing arm 34 has a relatively large surface area in contact with the bottom of motor plate 8 and is slidable on the plate; pin 29 is peened over against the swing arm to retain the arm in contact with the plate.

It is now apparent that depressing foot pedal 13 forwardly will cause idler pulley 33 to be moved from the position of FIGURE 3 toward the position of FIGURE 4 to provide for take-up of V-belt 36.

A tension spring 37 has one end thereof secured to an upstanding portion 38 of swing arm 34 and the other end of the spring is retained by a depending flange 39 of motor plate 8. Spring 37 normally biases the swing arm 34 and idler pulley 33 toward the FIGURE 3 position since the spring is attached on the side of pivot pin 29 opposite the pulley, and is effective to release the belt 36 quickly when pressure is removed from the pedal 13; also through the return pivot action of the swing arm the pedal 13 is itself biased rearwardly.

The V-belt 36 passes over the V-belt pulley 40 of fixed diameter carried on input shaft 41 of gear box 10. Thus power to the gear box and the rearward drive wheels is transmitted through V-belt 36.

The drive arrangement for belt 36 is most clearly shown in FIGURES 3 and 4. As illustrated in FIGURE 3 the drive shaft 42 of gasoline engine 9 extends downwardly through the motor plate. A principal advantage of the structure of FIGURE 3 is that this drive shaft is of standard commercial length for gasoline engines of the 2–5 H.P. classification. No extension of the shaft is required to accommodate the components of the variable speed clutch assembly shown. Further the compact arrangement reduces the number of ball bearings normally necessary for accomplishing the functions of providing drive power to the device and concurrently permitting functioning of an implement or tool directly from the drive shaft.

As shown engine shaft 42 has a shoulder at 44 and a spring retainer cap 45 has a reentrant portion 46 provided with an internal seat 47; seat 47 abuts against the shoulder 44. A conical coil spring 48 surrounds shaft 42 and has its larger upper end confined in engagement with the cap in the re-entrant portion 46. Cap 45 has a cylindrical skirt portion 50 which extends well downwardly around the spring, terminating above the lower end of the spring.

Skirt portion 50 is integral with the cap and is relatively rigid; suitably the cap is of brass and the skirt portion 50 provides a bearing surface for an upper axially slidable flange 54 of a variable speed pulley 55. Flange 54 has a relatively large axial cylindrical bore 56 forming a lower abutment 57 for the lower end of spring 48, a somewhat smaller circular axial shaft opening 58 in which shaft 42 is rotatably received, and a boss 59 of non-circular cross-section.

As shown in FIGURE 7 the boss 59 has a substantially square cross-section with its corners rounded off; the boss may have any suitable cross-section to provide a driving connection with its complementary flange 60 of variable speed pulley 55. Also the boss may be splined to engine shaft 42 for rotation therewith and axial movement therealong; however, the structure shown of the boss may be of cast iron and is economical to produce as well as providing long life—longer life than if the cast iron boss is keyed to the usual steel engine shaft.

A sleeve bearing 62 having an upper outwardly extending circumferential lip 63 and a lower internal annular base 64 provided with an opening 65 is received over shaft 42. Lip 63, as shown in FIGURE 5, engages boss 59 in one position of the boss and supports it upwardly on the shaft 42 while annular base 64 abuts the lower extremity of shaft 42.

A coupling member 66 grooved at 66a and having the flange 60 integral therewith receives the sleeve bearing 62 and the sleeve bearing and coupling member are suitably assembled together on shaft 42. The bearing 62 is provided with a longitudinal slot 67 extending through the lip 63 and axially part way down the bearing. A key 68 in a slot 69 of a cone portion 70 of the coupling member engages in a way of the shaft 42 and thereby the coupling member, sleeve bearing and shaft are retained for rotation together. For secure fastening a screw 72 is threaded through the cone portion 70 against the key 68.

The coupling member 66 is recessed axially at 73 in the same configuration as the boss 59 to provide a sliding mount for the boss in the recess 73. The boss is maintained spaced from the annular bottom 74 of the recess by lip 65. Accordingly when coupling member 66 is driven by engine shaft 42 the spring biased flange 54 will be rotated but free to move axially. Lip 63 serves to minimize the friction between the boss and annular bottom 74.

Coupling member 66 has integral therewith a V-belt flange 75 which is complementary to a V-belt flange 76 integral with a shell 77 which has (FIGURE 5) an upward opening 78. Shell 77 has an internal peripheral ridge 79 upon which the outer race 80 of the ball bearing 81 seats. A snap ring 82 engages the outer race 80 on its upper side. A lower internal cavity of the shell 77 is designated by the numeral 83 and this cavity communicates with the exterior of the shell through a threaded central opening 84.

In the cavity 83, as shown in FIGURES 5 and 6, an inverted generally cylindrical cup 85 is provided and has a small clearance with the sides of the shell 77. A bolt 86 abuts a washer 87 which engages against the inverted cup 85 as shown. The bolt 86 is provided with a threaded extremity which is threadedly received in a lower threaded portion 88 of the shaft 42. The inverted cup abuts against the inner race 89 of the bearing on the lower side of the bearing, while the inner race on its upper side engages against the lower extremity of the coupling 66. The cavity 83 is suitably filled with grease designated at 90 in order to inhibit frictional effects of the inverted cup in the rotation of the device.

The threaded opening 84 suitably receives threaded ends of a shaft 91 which shaft may support a component to be driven, such as a lawn mower blade 92. The pulley generally designated at 93 and formed by the flanges 75 and 76 receives a V-belt 94 which passes over a driven pulley 95. The V-belt 94 is a clutch belt and when not in operating condition lies free on the flange 76. The belt is tensioned through actuation of a bell crank 96 which carries the pulley 95 on a pin 97.

The bellcrank 96 is pivoted and rotates with a pin 98 which passes through a collar 99. This collar abuts the bottom of the motor plate and rotates thereon. The pin passes through the motor plate and through one end of a link 100 having an upstanding portion 101. The pin is peened over on the bellcrank 96 and also on the link 100, so that movement of the link is transmitted to the bellcrank.

From the upstanding portion 101 of the link 100 a spring 102 extends and has its opposed end secured to the motor plate. Also from the upstanding portion of the link a second spring 103 extends and has its opposed end engaged with a connector element 104 secured on a shaft 105. This shaft is suitably provided with a handle assembly 106 and is itself supported from the motor plate by support member 107 bolted to the plate in the depending rim of the plate. Actuation of the handle in a rearward direction relative to the motor plate biases the bellcrank in such a direction as to tighten belt 94.

It is also to be noted that the bellcrank has an upstanding flange 109 provided with a brake-lock 110, which brake-lock engages the pulley 95 in the slackened condition of the belt. This is for the purpose of bringing quickly to a stop a driven component, such as a lawn mower blade, when the belt 94 is disengaged.

The variable speed pulley 55 receives thereover the V-belt 36. As shown in FIGURE 5 the belt rides outwardly on the pulley with the pulley flanges in a closed condition, and accordingly the feet per minute speed of the belt is closed to its maximum.

While specific reference has been made to V-belts, other equivalent belting such as round belting may be employed, and the term V-belt is understood to include such equivalents.

Actuation of the foot pedal 13 to a more depressed position forwardly causes the idler pulley 33 to be moved in such a direction as to cause the belt 36 to take the inward position with the flanges in the open condition illustrated in FIGURE 6. In this position a considerably greater torque is provided to the output pulley and shaft.

It is to be noted that in the normal direction of control with little or no pressure on the controller pedal the pedal is biased by the spring 37 and the axially movable flange is biased by the cone spring 48. Accordingly in the specific arrangement shown the manual controller is actuated against the force exerted by the spring in attaining the second direction of control. Further the boss which extends well into the coupling member recess is prevented by the stop means, including the shoulder of the shaft, from slipping out of the recess.

Accordingly, in the operation of a device provided with the drive arrangement described, high speed is attained in a normal condition of the accelerator mechanism. When using a gear box the high speed is attained, with the power source operating, upon shifting into speed. When the driven unit is subjected to a materially increased resistance the actuation of the accelerator in response to operator instinct will decrease the speed and increase the torque output, thereby avoiding a tendency to stall. Thus the psychological reaction of the operator induces automatic corrective action by the operator.

It will be understood that this invention is susceptible

What is claimed is:

1. In combination, in power transmission mechanism, a power shaft, and axially disposed on the power shaft a V-belt pulley, said pulley having a first flange fixed on the said power shaft for rotation with the power shaft and a second complementary flange which is axially movable along the power shaft, an axial non-circular boss of said second flange extending into an axial recess of said first flange forming a power transmitting connection between the flanges, said second flange having a cylindrical bore and an abutment terminating said bore, a coil spring disposed around said power shaft and having a first end engaged against said abutment, a shoulder on said shaft, a cap having a re-entrant portion fitted over said shaft with said re-entrant portion retained by said shoulder, a second end of said coil spring engaged against said cap, and a skirt portion of said cap extending into the cylindrical bore of said second flange in sliding engagement with the flange forming a guide and bearing for the flange.

2. In combination, in power transmission mechanism, a drive shaft, and axially disposed on the drive shaft a V-belt pulley, said pulley having a first flange fixed on the said drive shaft for rotation with the drive shaft, said first flange also having an axial recess communicating with an axial shaft opening of the flange, a second and complementary flange of said pulley and which is axially movable, said second flange having a non-circular boss which extends into the recess of the first flange in sliding engagement with the first flange to form a power transmitting connection between the flanges, biasing means biasing the said second flange towards the first flange with said boss in said recess, means in the recess between the boss and flange on the bottom of the recess engageable with the boss to prevent bottoming of the boss, and other means comprising a shoulder of the drive shaft engaging the biasing means and limiting movement of the boss from the recess.

3. In combination, in power transmission mechanism, a power source, a drive shaft of the power source having a free extremity and stop means inwardly of said extremity, and axially disposed on said shaft and between said stop means and said extremity a pair of V-belt pulleys, a coupling member and an axial sleeve extending through an axial opening of the coupling member secured to the drive shaft for rotation therewith, said sleeve having a base engaging the said free extremity of said drive shaft and a peripheral lip opposite the base extending into a recess of the coupling member, said coupling member having integral therewith a first flange of one of said pulleys, a second and axially movable flange of said one of said pulleys complementary to said first flange and having a boss extending slidably into said recess of said coupling member and spaced from said coupling member by said lip of said sleeve, biasing means engaged against the stop means and biasing said second flange towards the said first flange, a third flange also integral with the coupling member, a fourth flange complementary to said third flange and forming with the third flange a second of the pulleys, and fastening means carried by the said extremity of the shaft supporting said fourth flange in axial relationship with the coupling member and third flange.

References Cited in the file of this patent
UNITED STATES PATENTS

| | | |
|---|---|---|
| Re. 18,333 | Reeves | Jan. 12, 1932 |
| 975,869 | Jones | Nov. 15, 1910 |
| 1,164,729 | Leach | Dec. 21, 1915 |
| 2,134,159 | Von Hofe | Oct. 25, 1938 |
| 2,209,736 | Livingston | July 30, 1940 |
| 2,641,138 | Janow | June 9, 1953 |
| 2,813,433 | Adams | Nov. 19, 1957 |
| 2,824,457 | Norton | Feb. 25, 1958 |